Feb. 15, 1949.   M. C. MILLER   2,461,755
FISH LURE
Filed Aug. 9, 1944
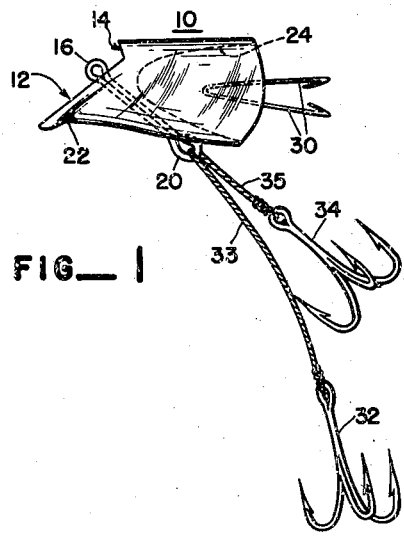
FIG_1
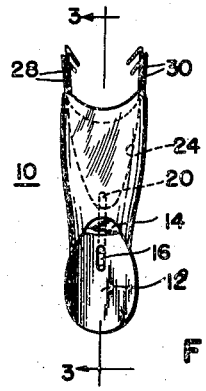
FIG_2
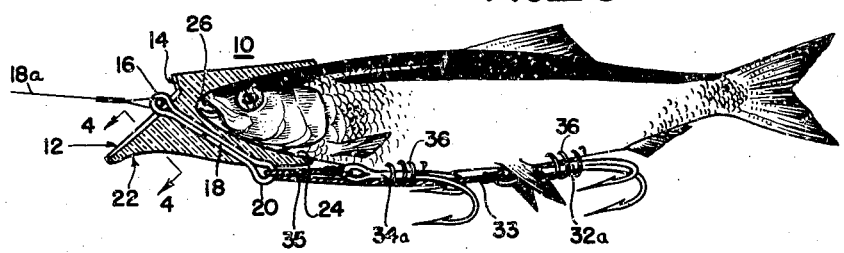
FIG_3
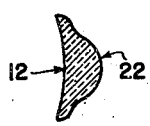
FIG_4
FIG_5
MYRON C. MILLER
Inventor
By Smith & Tuck
Attorney Patented Feb. 15, 1949

2,461,755

UNITED STATES PATENT OFFICE 2,461,755

FISH LURE

Myron C. Miller, Seattle, Wash.

Application August 9, 1944, Serial No. 548,673

3 Claims. (Cl. 43—40)

This invention relates to a fish lure and, more particularly, to means for employment with a baiting minnow to impart lifelike motions and protect the same during trolling.

In the art of fishing, both for sport and commercially, the fisherman constantly endeavors to attract fish to his bait by simulating the action of the lesser fishes and minnows which apparently are the constant prey of the larger game fishes. The more skillful fishermen employ a myriad of devices and means for gaining this end; such devices being spoons, plugs, rotary lures and the like; and such means including real or imitation minnows, herrings, herring fillets and certain meat cuts. In every instance the lure is intended to be drawn through the water and to have imparted to its motions actions resembling the natural swimming or darting action of the lesser fishes, for the attraction and attack of the game or greater fishes. In the case of the minnow-imitating devices, the best natural result obtained is only a superficial simulation of the minnow, whereas, in the case of real bait, there is little or no action obtained, except by exercise of great skill as in "spinning" in which a herring fillet is so deformed with snells and hooks as to be drawn through the water like a minnow and to imitate live or crippled bait. Additionally, in the use of whole minnows, great difficulties are encountered, due to bloating and bursting of the fish, due to the filling of the visceral cavity with water, and also due to deterioration because of the tearing action upon the minnow's skin and other parts. Intricate and delicate devices have been used for harnessing such minnows, but they are complicated and, therefore, difficult to attach, especially when the weather is cold and the fisherman's fingers are stiff and cramped.

Having in mind the defects of the prior art, it is an important object of my invention to provide a fishing lure that is adapted to receive and retain a portion of a baiting minnow, and to impart, when drawn through the water, a lifelike swimming and darting motion to the bait.

Another object of the invention resides in the provision, in a fish lure as described, of a deflecting surface operable, as it is trolled, to activate the baiting minnow in a controlled manner.

Still another object of the invention is to provide a fish lure for use with baiting minnows that imparts lateral movements to the bait, but is invisible to the fish sought to be attracted to the bait.

A further object of the invention is the provision, in a fish lure as set forth, of hooks and hook-attaching means, which serve to retain the baiting minnow, as well as to catch the fish sought, without deleteriously affecting the baiting minnow.

A still further object of the invention is to provide in a fish lure of the type described, a releasable element for readily engaging the head of the baiting minnow and for retaining the same in proper associated manner with the luring device.

The foregoing objects and others ancillary thereto I prefer to accomplish as follows:

According to a preferred embodiment of the invention, I provide a head stall having a forwardly-facing deflecting surface with which may be associated means for trolling the same. The head stall may be formed of opaque material, such as wood or the like, but one form of the invention is advantageously formed of transparent material, such as methyl-methacrylate, or other transparent plastic or thermo-plastic materials which become invisible when immersed in water. The body comprising the head stall has a rearward open cavity for the reception of the head of a baiting minnow and means, preferably releasable, may be employed for retaining such a minnow's head in adjusted relation within the cavity. Fishing hooks are associated with the head stall by means of a snood secured eccentrically thereof, and these hooks are also employed to assist in holding the minnow to the head stall, as well as to hook fish attracted to strike at the lure and minnow. Means is also provided for securing the fish hooks to the baiting minnow, in one of which cases, a coil member is used.

The novel features that I consider characteristic of my invention are set forth with particularity in the appended claims. The invention, itself, however, both as to its organization and its method of use, together with additional objects and advantages thereof, will best be understood from the following description of a specific embodiment when read in connection with the accompanying drawings, in which:

Fig. 1 is a side view in elevation of my fish lure;

Fig. 2 is a top plan view of the fish lure of Fig. 1;

Fig. 3 is a vertical sectional view of the fish lure taken along the longitudinal axis in the plane of line 3—3 of Fig. 2, with a baiting minnow shown associated therewith;

Fig. 4 is a cross-sectional view taken on line 4—4 of Fig. 3; and

Fig. 5 is a detail view of means employed in securing the fish hook to the baiting minnow.

A fish lure, to overcome the defects hereinbefore enumerated, must have at least two totally distinct characteristics; it must be capable of readily receiving and securely retaining by the head a baiting minnow; and it must also impart life-like motion to the baiting minnow without detracting from the normal luring qualities of the same as it is trolled through the water. Accordingly, a preferred embodiment of my invention is constituted by a formed body member having open cavitation into which the nose end of a minnow may be inserted and retained as shown in Figures 1 and 3, in which the numeral 10 designates a body substantially oval in vertical cross-section. Body 10 on its forward portion has the inclined deflecting face or surface 12, shown in Fig. 4 to be slightly concaved laterally. A second deflection surface 14 is also formed in the body 10 at an angular relation to surface 12.

A loop 16 is provided in surface 12 at the approximate axis of body 10, and to this, during the use of the lure as such, a fishing line or snell 18a may be attached. Loop 16 may be screw eye or, as here shown in a preferred form of the invention, is formed on the end of link 18 which passes rearwardly downward through body 10 and has the snood receiving loop 20 outstanding on the under side of the body. In a wooden body 10 the link 18 may be a wire strand having loops formed thereon, after the wire is passed through the body, or it may be preformed as here disclosed and cast in place in the body during molding of the same according to the well-known practices of insert casting.

Body 10 is provided with a slightly undercut throat 22 shown in Fig. 4 to be convex in cross-section and to merge smoothly with the generally ovate shape of the body as described above. A cavity 24 open to the rearward of the body is shaped to conveniently receive the nose and head of a baiting minnow. The walls of this cavity are preferably converging as they extend forward in the body and the deepest recess is somewhat pointed, as at 26, so that when the minnow's nose is inserted the jaws are urged shut and there retained during use in the water. By this arrangement water is precluded from entering the minnow's mouth to distort the same, and precluded from gaining access in force and volume to the visceral cavity, which would otherwise bloat and burst when the bait is drawn open-mouthed as in trolling.

Means is employed in connection with the lure body for engaging the head of the minnow and, in one form I have thus far devised I use the barbed pins 28, 30 for this purpose. The shanks of such hooks are flexible and can be sprung during insertion or removal from the gill area of the minnow and will serve to grasp the boney structure of the head to lock the matter in place in cavity 24.

A single hook or set of hooks 32 may be engaged into the rear underside of the minnow or a secondary set 34 may be added if it is desirable or possible to use so many. One of the hooks of each set is shown in the drawing to be inserted into the minnow while the others stand out from the body. A snood or line 33, 35 runs from the eye of each of the hook sets to the loop 20, where it can be anchored tightly by a knot; or the lines from each hook set may be one and the same passing through loop 20 to constitute a free-running snood as seen in Figures 1 and 3.

In baiting the lure, small herrings are used in the Puget Sound area. Normally such herrings are dead and often are frozen stiff following periods of refrigerative storage. Since different fishermen have their likes and individual schemes of baiting, some will use herring no longer than 3 to 4 inches, whereas others insist upon baiting minnows 7 to 10 inches long. All such sizes are equally well activated with my head-stall fish lure, if a portion of the head can be inserted and firmly anchored in the cavity 24. This last is done by inserting the nose into the cavity and simultaneously expanding the barbs of pins 28, 30. When the nose is seated and the jaws are properly closed, the barbs are inserted into the meat of the minnow and grasp the same. Next, the hooks 32 or 34 are positioned along the belly of the minnow by gaffing them therein or they are secured by coil members 36 which are twisted into the minnow as shown in Fig. 3, in which double hooks only are used. The coil of wire 36 encircles the shanks of hooks 32a and 34a and a sharpened end is inserted into the minnow's belly whereupon additional turning will work the coil in and out of the meat. Ordinarily one hook is secured to the minnow and then the free-running snood is drawn up to remove most of the slack and the other hook is set in place so that the two lines do not have undesirable drops in them.

With a trolling line and snell attached, the lure and minnow are next placed in the water and it will be observed that a very natural and life-like wiggle is imparted when the assembly is moved through the water. Occasionally a fisherman prefers a particular type of action which he may obtain by varying the position at which the hooks are set in the fish. It is an observed fact that the action of this lure baited with a minnow is substantially identical with the action of a live minnow, in that it darts and swims erratically, much the same as does the crippled live minnow. The action is not purely mechanical since any tendency for the head-stall to stabilize as it is drawn through the water is upset partly by the action of the two conflicting, deflecting faces, but mostly due to the unbalancing action of the flexible minnow's body which wriggles and twists from side to side unrestricted in any way.

The use of methyl-methacrylate to form the head stall has two marked advantages. The material is thermoplastic and thus is capable of being easily molded into complicated shapes having many curves, and also is simple to use with insert casting operations. But, in addition, this particular transparent material not only permits the fisherman to observe the nature of the positioning of the fish's head and nose in the cavity 24, but also it becomes invisible when immersed in the water to such an extent that the fish's eye, jaw, gills and the like, are the only substances to be seen clearly from the side. This phenomena is not unknown, but its use in this instance appears to lend particular advantage to this lure because there is less distracting foreign matter present adjacent the minnow to frighten the game fish away from the bait or to destroy the effect of naturalness of the minnow.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. A trolling device for fishermen, comprising: a head stall formed of a single casting of transparent material and having a rearwardly open cavity for the reception of the head of a baiting minnow, said head stall including a scoop-like forwardly facing laterally concave water impingement surface whose median crosses the longitudinal axis of the head stall at an angle other than at right angles, said head stall being cut away behind and below said water impingement surface to form a prominent lip, a link embedded in said head stall and having at each end an eye, one of said eyes protruding from the water impingement surface above the center thereof in its median to receive a trolling line, the other of said eyes protruding from said head stall behind said lip and beneath the longitudinal axis of the head stall, resilient means embedded in said head stall to engage a minnow and hold it in said cavity, and fish hooks associated with said eye behind the lip.

2. A trolling device for fishermen, comprising: a head stall formed of a single casting of transparent material and having a rearwardly open cavity for the reception of the head of a baiting minnow, said head stall including a scoop-like forwardly facing laterally concave water impingement surface whose median crosses the longitudinal axis of the head stall at an angle other than at right angles, said head stall being cut away behind and below said water impingement surface to form a prominent lip, an eye secured in said head stall and outstanding from said water impingement surface above the center thereof in its median to receive a trolling line, a second eye secured in said head stall outstanding behind said lip and beneath the longitudinal axis of the head stall, means embedded in said head stall to engage a minnow and hold it in said cavity, and fish hook means associated with said second eye behind the lip.

3. A trolling device for fishermen, comprising: a head stall formed as a single casting of transparent material and having a rearwardly open cavity for the reception of the head of a baiting minnow, said head stall including a scoop-like forwardly facing laterally concave first water impingement surface whose median forms an angle with the longitudinal axis of the head stall, said head stall behind and below said first water impingement surface being cut-away to form a lip, a link embedded in said head stall, and having at each end an eye, one of said eyes protruding from the water impingement surface above the center thereof in its median, the other of said eyes protruding from said head stall behind said lip and beneath the longitudinal axis of the head stall, a second water impingement surface integral with said head stall and overhanging said first water impingement surface at an abrupt angle thereto, the upper surface of said head stall from the forward edge of said second water impingement surface rearward and over the cavity comprising a substantially straight line, resilient means embedded in said head stall to engage a minnow and hold it in said cavity, and fish hooks associated with said eye behind the lip.

MYRON C. MILLER.

REFERENCES CITED

The following references are of record in the file of this patent:

UNITED STATES PATENTS

| Number | Name | Date |
| --- | --- | --- |
| 573,572 | Dales | Dec. 22, 1896 |
| 2,102,492 | Stolley | Dec. 14, 1937 |
| 2,112,385 | Smith | Mar. 29, 1938 |
| 2,359,410 | Edwards | Oct. 3, 1944 |
| 2,373,417 | Rosegard | Apr. 10, 1945 |

FOREIGN PATENTS

| Number | Country | Date |
| --- | --- | --- |
| 94,393 | Sweden | Oct. 27, 1936 |
| 15,106 | Great Britain | 1908 |
| 468,605 | Great Britain | July 8, 1937 |